United States Patent
Lundy et al.

(10) Patent No.: US 7,865,205 B1
(45) Date of Patent: Jan. 4, 2011

(54) METHOD AND SYSTEM FOR MANAGING PUSH-TO-TALK MODES

(75) Inventors: Michael T Lundy, Olathe, KS (US);
Louie E Wingo, Liberty, MO (US);
Harry H Lai, Overland Park, KS (US);
Daniel J Cureton, Washington, DC (US)

(73) Assignee: Sprint Spectrum L.P., Overland Park, KS (US)

(*) Notice: Subject to any disclaimer, the term of this patent is extended or adjusted under 35 U.S.C. 154(b) by 848 days.

(21) Appl. No.: 11/680,672

(22) Filed: Mar. 1, 2007
(Under 37 CFR 1.47)

(51) Int. Cl.
*H04B 7/00* (2006.01)
*G08C 15/00* (2006.01)
*H04M 1/64* (2006.01)
*H04M 15/06* (2006.01)
*H04M 3/00* (2006.01)

(52) U.S. Cl. .............. 455/518; 370/229; 379/88.12; 379/88.22; 379/142.01; 455/418

(58) Field of Classification Search ............ None
See application file for complete search history.

(56) References Cited

U.S. PATENT DOCUMENTS

| | | | | |
|---|---|---|---|---|
| 6,587,549 | B1* | 7/2003 | Weik | 379/93.24 |
| 6,865,398 | B2 | 3/2005 | Mangal et al. | |
| 7,457,321 | B2* | 11/2008 | Jang et al. | 370/503 |
| 2002/0061761 | A1* | 5/2002 | Maggenti et al. | 455/518 |
| 2002/0102999 | A1* | 8/2002 | Maggenti et al. | 455/518 |
| 2003/0008687 | A1* | 1/2003 | Nishimura | 455/567 |
| 2004/0187109 | A1 | 9/2004 | Ross et al. | |
| 2004/0196963 | A1* | 10/2004 | Appelman et al. | 379/88.12 |
| 2005/0009547 | A1 | 1/2005 | Harris et al. | |
| 2005/0009548 | A1 | 1/2005 | Kelley et al. | |
| 2005/0079858 | A1 | 4/2005 | Rosen et al. | |
| 2005/0164681 | A1* | 7/2005 | Jenkins et al. | 455/412.1 |
| 2005/0164682 | A1* | 7/2005 | Jenkins et al. | 455/412.1 |

(Continued)

FOREIGN PATENT DOCUMENTS

EP 0 750 413 A2 12/1996

OTHER PUBLICATIONS

Cingular Wireless, push to talk FAQ's, http://www.cingular.com/pushtotalk/faq_pop, printed on Aug. 8, 2006.

(Continued)

*Primary Examiner*—Duc Nguyen
*Assistant Examiner*—Ayodeji Ayotunde

(57) ABSTRACT

A mobile station has a plurality of modes for processing incoming push-to-talk (PTT) audio communications. A first PTT mode is a "forced audio" mode, in which the mobile station plays PTT audio communications automatically. A second PTT mode is a "polite" mode, in which the mobile station plays PTT audio communications only after acceptance by the user. A "white list" identifies any parties that are allowed to communicate with the mobile station using the first PTT mode. A PTT audio communication from an initiator that is not identified in the white list is processed using the second PTT mode, even if the first PTT mode is requested. In addition, a PTT audio communication may be processed using the second PTT mode if the mobile station's speaker volume level is below a threshold value.

20 Claims, 4 Drawing Sheets

U.S. PATENT DOCUMENTS

2005/0239449 A1   10/2005  Timms
2006/0014556 A1    1/2006  Park et al.
2006/0146701 A1*  7/2006  Barnes et al. ............... 370/229
2006/0154681 A1*  7/2006  Park et al. ................... 455/518
2006/0188081 A1*  8/2006  Hooper et al. ......... 379/211.02
2008/0248826 A1* 10/2008  Holm ......................... 455/518

OTHER PUBLICATIONS

Vodacom, Push-to-Talk, http://www.vodacom.co.za/services/push_to_talk/guide.jsp, printed on Sep. 5, 2006.

M. Garcia-Martin, "A Session Initiation Protocol (SIP) Event Package and Data Format for Various Settings in Support for the Push-to-Talk over Cellular (PoC) Service," Request for Comments 4354, Jan. 2006.

\* cited by examiner

METHOD AND SYSTEM FOR MANAGING PUSH-TO-TALK MODES

BACKGROUND

1. Field of the Invention

The present invention relates to telecommunications and, more particularly, to a method and system for managing multiple "push-to-talk" (PTT) communication modes.

2. Description of Related Art

Many wireless service providers have begun offering a half-duplex form of wireless communication that is commonly known as "push-to-talk" (PTT) service. PTT service can provide a user experience that is, in many respects, similar to "walkie-talkie" communication with two-way radios.

In a typical implementation, an initiator interacts with a menu on the initiator's mobile station to select a subscriber or group of subscribers as recipients of a PTT audio communication. To initiate a PTT audio communication, the initiator presses and holds a PTT button on the mobile station. In response, the mobile station wirelessly transmits signals to set up the connection. When the connection has been established, the mobile station plays a tone or other readiness signal. At that point, the initiator may begin speaking. The initiator releases the PTT button when finished speaking. The initiator's PTT audio communication is conveyed through the network to the recipients' mobile stations. When a mobile station receives the PTT audio communication, the mobile station will typically generate an incoming audio indication (such as a beeping sound) and then play the initiator's audio message automatically through a speaker. After the initiator's PTT audio communication is played out, a recipient may press a PTT button on the recipient's mobile station and begin speaking to send a responsive PTT audio communication.

One attraction of PTT service is its directness. In particular, the "forced audio" aspect, in which the recipient's mobile station plays the PTT audio communication automatically, avoids the steps of ringing the recipient's mobile station and then waiting for the recipient to answer, as is typically done for a wireless telephone call. However, forced audio can be undesirable in certain situations. For example, if a recipient is in a meeting, a PTT audio communication could be an undesirable interruption for the recipient, and it might be heard by others at the meeting. Another limitation of forced audio is that the recipient may not hear the audio communication if the recipient is away from the recipient's mobile station.

Some wireless service providers have offered features that can reduce some of the undesirable aspects of "forced audio" PTT service. As one example, a subscriber may be able to activate a "Do Not Disturb" feature that prevents any PTT communications from being sent to that subscriber. As another example, a subscriber may be able to turn down the volume on the mobile station's speaker or set the mobile station on a silent or vibrate mode so as to avoid interruptions caused by forced audio communications.

Although these features can provide benefits, they have the disadvantage of requiring the subscriber to take action in order to avoid undesirable PTT communication. In particular, a "Do Not Disturb" feature does not help much if the subscriber forgets to activate it and then gets interrupted by a PTT communication during a meeting. A "Do Not Disturb" feature is also counterproductive if the subscriber activates it before a meeting but then forgets to de-activate afterward.

Accordingly, there continues to be a need for providing ways of reducing the undesirable aspects of PTT communication.

SUMMARY

In a first principal aspect, an exemplary embodiment of the present invention provides a system comprising a mobile station and a profile. The mobile station has a plurality of modes for processing incoming push-to-talk (PTT) audio communications. The plurality of modes includes a first mode, in which the mobile station plays PTT audio communications automatically, and a second mode, in which the mobile station plays PTT audio communications only after acceptance by a user of the mobile station. The profile defines a first list that identifies any parties that are allowed to communicate with said mobile station using the first mode.

In a second principal aspect, an exemplary embodiment of the present invention provides a method for push-to-talk (PTT) communication. In accordance with the method, a PTT request to send a PTT audio communication to a recipient is received from an initiator. The recipient is associated with a recipient mobile station. A permission level for the PTT audio communication is determined. If the permission level is at a first level, the PTT audio communication is processed in accordance with a first PTT mode. If the permission level for the PTT audio communication is at a second level, the PTT audio communication is processed in accordance with a second PTT mode.

DETAILED DESCRIPTION OF EXEMPLARY EMBODIMENTS

1. Overview

Figure 1:
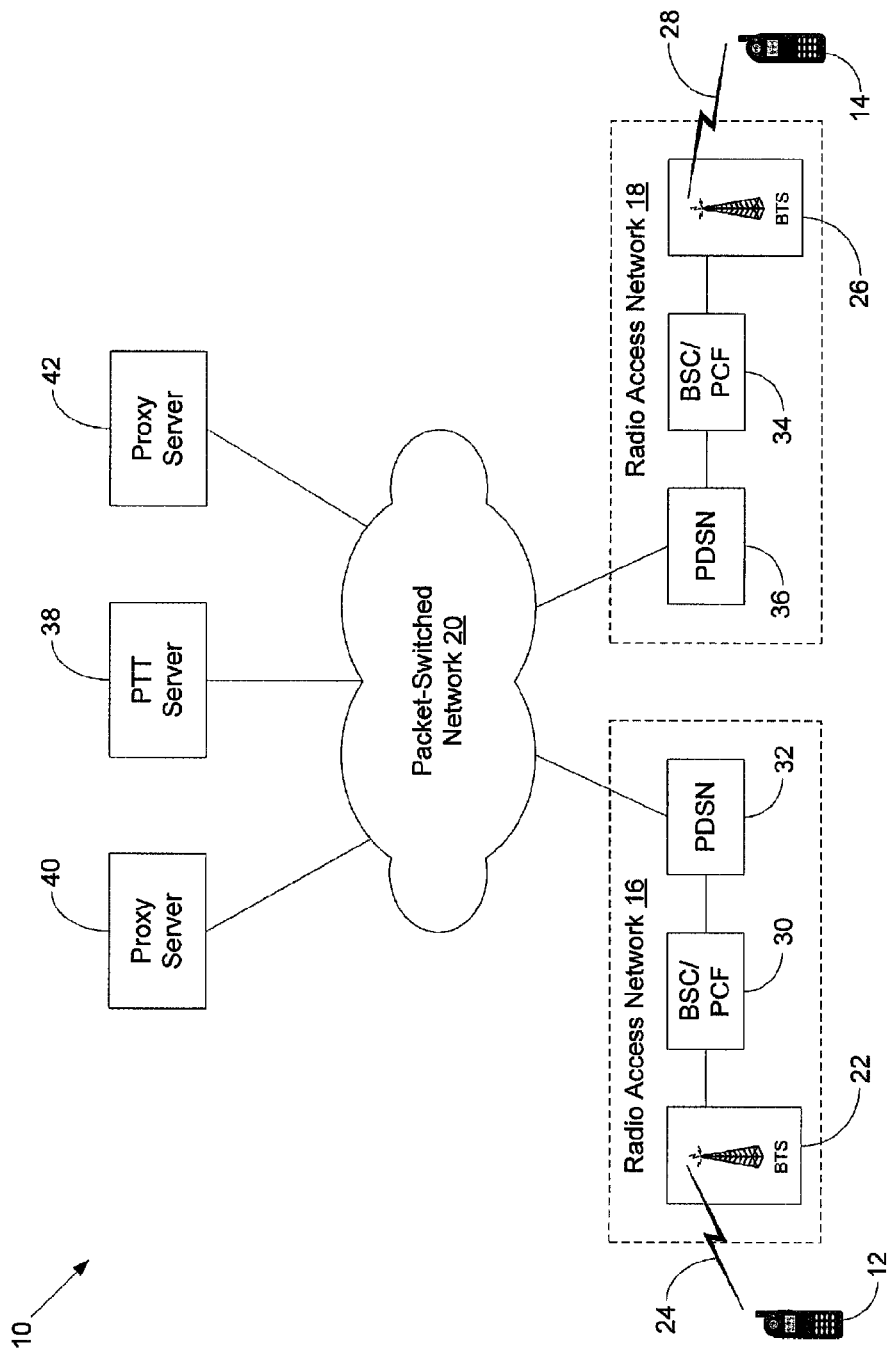
FIG. 1 is a simplified block diagram of a wireless telecommunications network, in accordance with an exemplary embodiment.

The present invention, in exemplary embodiments, addresses some of the undesirable aspects of PTT communication by providing a plurality of modes for processing incoming PTT audio communications. For example, a mobile station may support a "forced audio" mode in which the mobile station plays PTT audio communications automatically.

However, the mobile station may also support a "polite" mode in which the mobile station plays PTT audio communications only after acceptance by a user of the mobile station. For example, the mobile station may generate a user-discernible indication of an incoming PTT audio communication. The user-discernible indication could be an audible indication, such as a tone. Alternatively, the user-discernible indication could be a visual indication, such as a message on the mobile station's display, a vibration, or some other form. If the user accepts the PTT audio communication, then it is played out, e.g., through the mobile station's speaker. However, if the user does not accept the PTT audio communication (for example, because the user is in a meeting or is not in the vicinity of the mobile station), then the initiator may be informed that the intended recipient is unavailable.

This "polite" mode could be implemented in different ways. In one approach, the determination of whether the recipient accepts the PTT audio communication is made before the initiator begins speaking. For example, the initiator may receive a readiness signal indicating that the initiator may begin speaking only after the recipient has accepted the communication. In an alternative approach, the initiator may be able to begin speaking before the recipient has accepted. The audio may buffered (either in the network or in the recipient's mobile station) until the recipient accepts, and the buffered audio may be played out upon acceptance.

In either case, the "polite" mode can avoid the undesirable interruptions that can be caused by the forced audio mode. It is to be understood that the foregoing forced audio and polite modes are exemplary only. Other PTT modes may also be supported.

These multiple PTT modes may be managed on the basis of permission levels. The permission levels could be set, at least in part, based on subscriber preferences. For example, a subscriber may specify which parties (if any) are allowed to communicate with the subscriber using the forced audio mode, with other all parties limited to using the polite mode for PTT communications with the subscriber. The permission levels could also be set, at least in part, based on other information, such as the speaker volume level on the subscriber's mobile station. If the speaker volume level is low (e.g., because the subscriber is in a meeting), then only the polite mode may be available for communicating with that subscriber.

These permission levels may be used to determine how to process PTT audio communications. In particular, an initiator of a PTT audio communication might select a particular mode for processing the communication, or the initiator may send a PTT audio communication without specifying a particular mode. In either case, however, the mode that is actually used may depend on a permission level that is determined for the PTT audio communication. For example, if the PTT audio communication is determined to have a high permission level, then it may be processed in accordance with the forced audio mode (unless the initiator specified the polite mode). On the other hand, if the PTT audio communication is determined to have a low permission level, then it may be processed in accordance with the polite mode (even though the initiator may have specified the forced audio mode).

The permission level for a particular PTT audio communication could be determined by referring to a profile associated with the recipient. In particular, the profile may include a "white list" that identifies any parties that are allowed to communicate with the recipient using the forced audio mode. The PTT audio communication may then be processed using the forced audio mode only if the initiator is identified in the white list. Otherwise, the PTT audio communication may be processed using the polite mode. The recipient's profile may also include other information, such as a "black list" that identifies any parties that are not allowed to communicate with the recipient using either PTT mode.

In one exemplary embodiment, recipient profiles may be stored in the network and accessed by a PTT server that manages PTT communication sessions. For example, the PTT server may receive from an initiator a PTT request, such as a Session Initiation Protocol (SIP) INVITE message, requesting a PTT audio communication to a recipient. The PTT server may then refer to the recipient's profile to determine a permission level for the requested PTT audio communication. If the PTT request from the initiator requests forced audio but the permission level is determined to be low (e.g., because the initiator is not in the recipient's "white list"), then the PTT server may send a PTT request to the recipient in accordance with the polite mode. In this way, the PTT server may effectively convert a forced audio PTT communication to a polite PTT communication.

In another exemplary embodiment, a recipient profile may be stored on the recipient's mobile station. In that case, the recipient mobile station, rather than the PTT server, may determine how to process PTT audio communications. For example, the recipient mobile station may receive a forced audio PTT audio communication but, if the permission level for the communication is low, may nonetheless process the PTT audio communication in accordance with the polite mode. Thus, rather than playing the audio communication automatically, the recipient mobile station would notify the user of the incoming communication and play the communication only after the user has accepted it. In this way, a recipient mobile station may also be able convert a forced audio PTT communication to a polite PTT communication.

It is to be understood that a permission level for a PTT audio communication may be determined based on factors other than or in addition to the recipient's profile. For example, a permission level for a PTT audio communication may also be affected by one or more audio conditions at the recipient's mobile station, such as a speaker volume level. For example, even when the recipient's profile indicates that forced audio is allowed for a PTT audio communication, e.g., because the initiator is in the recipient's white list, the permission level may nonetheless determined to be low (so that only the polite mode is available) if the speaker volume level on the recipient's mobile station is below a threshold.

In some cases, a mobile station may transmit information regarding audio conditions at the mobile station, such as the speaker volume level, to the network. That way, the PTT server may use the information to determine permission levels. In other cases, a mobile station may evaluate the speaker volume level and/or other audio condition when the mobile station receives a PTT request and then processes the PTT communication accordingly.

By providing multiple modes for PTT communication and multiple permission levels, a subscriber can be given more control over the subscriber's PTT service. For example, a subscriber may choose to allow only polite mode PTT communications. Alternatively, a subscriber may allow forced audio PTT communications from only certain high-priority parties, such as co-workers or family members, with only the polite mode available to all other parties. With this flexibility, a subscriber can reduce the possibility of undesirable interruptions caused by forced audio PTT communications.

2. Exemplary Network Architecture

FIG. 1 illustrates an exemplary wireless telecommunications network 10. In an exemplary embodiment, network 10 provides mobile stations, such as mobile stations 12 and 14, with wireless packet-based communication service, through which the mobile stations may send and receive voice, data, video and/or other media via an air interface. Mobile stations 12 and 14 could be, for example, wireless telephones, wireless personal digital assistants (PDAs) or other wireless communication devices. Mobile stations 12 and 14 may wirelessly communicate with radio access networks (RANs) 16 and 18, which, in turn, may be communicatively coupled to a packet-switched network 20. The communications between mobile stations 12 and 14 and RANs 16 and 18 may use an air interface protocol such as IS-2000 (1xRTT) or IS-856 (EV-DO).

RAN 16 and 18 may each include one or more base transceiver stations (BTSs) that provide wireless coverage areas for communication with mobile stations. Thus, RAN 16 may include a BTS 22 that communicates with mobile station 12 over an air interface 24, and RAN 18 may include a BTS 26 that communications with mobile station 14 over an air interface 28. The BTSs may be controlled by base station controllers (BSCs) with packet control functions (PCFs), which, in turn, may be communicatively coupled to packet-switched network 20 via packet data serving nodes (PDSNs). Thus, BTS 22 may be coupled to BSC/PCF 30, which may be coupled to PDSN 32, and BTS 26 may be coupled to BSC/PCF 34, which may be coupled to PDSN 36. PDSNs 32 and 36 may provide RANs 16 and 18, respectively, with access to packet-switched network 20.

Packet-switched network 20 may include a wide area network, such as the Internet, that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 20 in a real-time format. Other protocols, such as the Session Initiation Protocol (SIP), may be used to set up and/or manage communication sessions through packet-switched network 20.

Such communication sessions may include push-to-talk (PTT) sessions between two or more mobile stations, e.g., between mobile stations 12 and 14. During such a PTT session, the mobile stations are able to communicate one at a time (half-duplex communication), e.g., as if mobile stations were "walkie-talkie" radios. For example, an initiator may press a PTT button on the initiator's mobile station and begin talking so that the initiator's speech is conveyed (with some latency) to a particular, recipient mobile station or to a group of recipient mobile stations (e.g., as specified in a buddy list or group call list). To facilitate such PTT sessions, wireless telecommunications system 10 may include a PTT server 38 that is communicatively coupled to packet-switched network 20.

PTT server 38 may serve as the anchor point for the signaling used to set up PTT sessions and for the media streams that are conveyed during the PTT session. Mobile stations 12 and 14 may include respective PTT clients for communicating with PTT server 38. The communication between PTT server 38 and PTT clients in mobile stations 12 and 14 may use an open standard protocol, such as SIP, or a proprietary protocol, such as the QChat Signaling Protocol (QSP). For example, a SIP INVITE message could be used to request a PTT session. The SIP INVITE message might also specify a particular PTT mode, e.g., either the forced audio or polite mode. For example, a SIP message could use the Session Description Protocol (SDP) to specify a particular PTT mode.

To initiate a PTT session, an initiator mobile station (e.g., mobile station 12) may send a message (e.g., a SIP INVITE message) to PTT server 38. PTT server 38 may then engage in signaling with the one or more recipient mobile stations (e.g., mobile station 14). In this way, a media stream may be established between PTT server 38 and the initiator's mobile station, and one or more media streams may be established between PTT server 38 and the one or more recipient mobile stations, with PTT server 38 conferencing the various media streams together.

Communications between PTT server 38 and mobile stations 12 and 14 may occur via one or more intermediate network elements. For example, the signaling between the initiator's mobile station and PTT server 38 may be conveyed via one or more proxy servers, and the signaling between the recipient mobile station and PTT server 38 may be conveyed via one or more proxy servers. Thus, the signaling between mobile station 12 and PTT server 38 may be conveyed via a proxy server 40, and the signaling between mobile station 14 and PTT server 38 may be conveyed via proxy server 42. In an exemplary embodiment, each proxy server serves a particular area. Thus, proxy server 40 may serve RAN 16, and proxy server 42 may server RAN 18.

3. Exemplary Subscriber Profile

Figure 2:
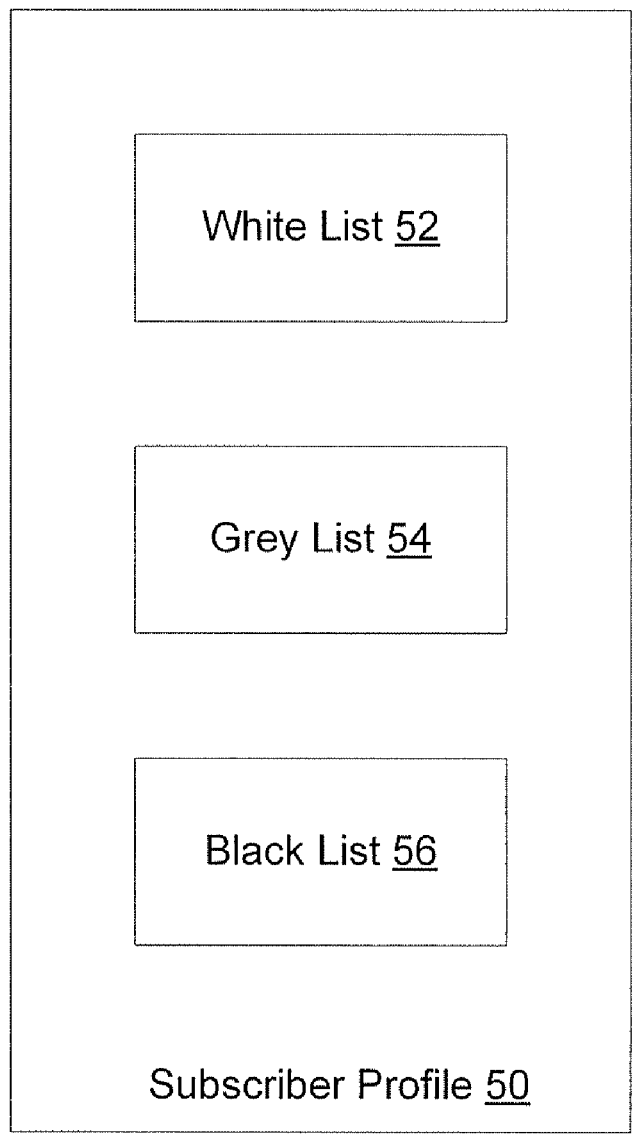
FIG. 2 is a schematic diagram illustrating a subscriber profile that may be used to determine permission levels for PTT audio communications, in accordance with an exemplary embodiment.

FIG. 2 schematically illustrates a subscriber profile 50 that may be used to determine permission levels for PTT audio communications. With reference to FIG. 1, subscriber profile 50 may be located in wireless telecommunications network 10. For example, subscriber profile 50 may stored in PTT server 38 or in a database accessible to PTT server 38. Alternatively, subscriber profile 50 may be stored in the subscriber's mobile station. For example, mobile stations 12 and 14 may stores profiles of their respective subscribers.

As shown in FIG. 2, subscriber profile 50 may define various lists that can identify parties for purposes of determining permission levels of PTT audio communications to that subscriber. In general, the lists defined by subscriber profile 50 may depend on the type and number of PTT modes that are supported. When a forced-audio PTT mode and a polite PTT mode are supported, subscriber profile 50 may include a "white list" 52, a "grey list" 54, and a "black list" 56. White list 52 identifies any parties that are allowed to communicate with the subscriber using the forced audio PTT mode. Grey list 54 identifies any parties that are allowed to communicate with the subscriber using the polite PTT mode. Black list 56 identifies any parties that are not allowed to communicate with the subscriber using either mode.

A list might identify a party explicitly, for example, by name, mobile directory number (MDN), network access identifier (NAI), or in some other manner. Alternatively, a list might identify parties implicitly. For example, grey list 54 may be defined as any party that is not identified in either white list 52 or in black list 56.

The lists defined by subscriber profile 50 may be populated by the subscriber. For example, when a subscriber first subscribes to PTT service, white list 52 and black list 56 may be empty. Thus, the polite mode may be the only PTT mode available for communicating with the subscriber's mobile station. However, the subscriber may subsequently add one or more parties to white list 52, so as to allow those parties to communicate with the subscriber using forced audio. The subscriber may also add one or more parties to black list 56, so as to disallow all modes of PTT communication from those parties. The subscriber may also remove parties from white list 52 and black list 56. The subscriber may add and remove parties from the lists in various ways, for example, by interacting with a user interface of the subscriber's mobile station.

In addition to allowing one or more parties to send forced audio PTT communications, populating white list 52 may also affect the functioning of the subscriber's mobile station in other ways. For example, when white list 52 is empty, the subscriber's mobile station may check for paging messages at a low slot cycle frequency. However, if the subscriber populates white list 52 with one or more parties, the subscriber's mobile station may check for paging messages at a higher slot cycle frequency. For example, a PTT client in the subscriber's mobile station may detect that the subscriber has populated white list 52. In response, the PTT client may cause the mobile station to send an attribute update message to the network to increase the mobile station's slot cycle frequency.

The higher slot cycle frequency is beneficial for forced audio PTT communications because it reduces latency, albeit at the expense of higher battery drain. Low latency is not as important for the polite mode because the user needs to be notified of and then accept incoming PTT communications. Thus, when white list 52 is empty, so that only the polite mode is available, a low slot cycle frequency is beneficial in order to increase battery life.

4. Exemplary Mobile Station

Figure 3:
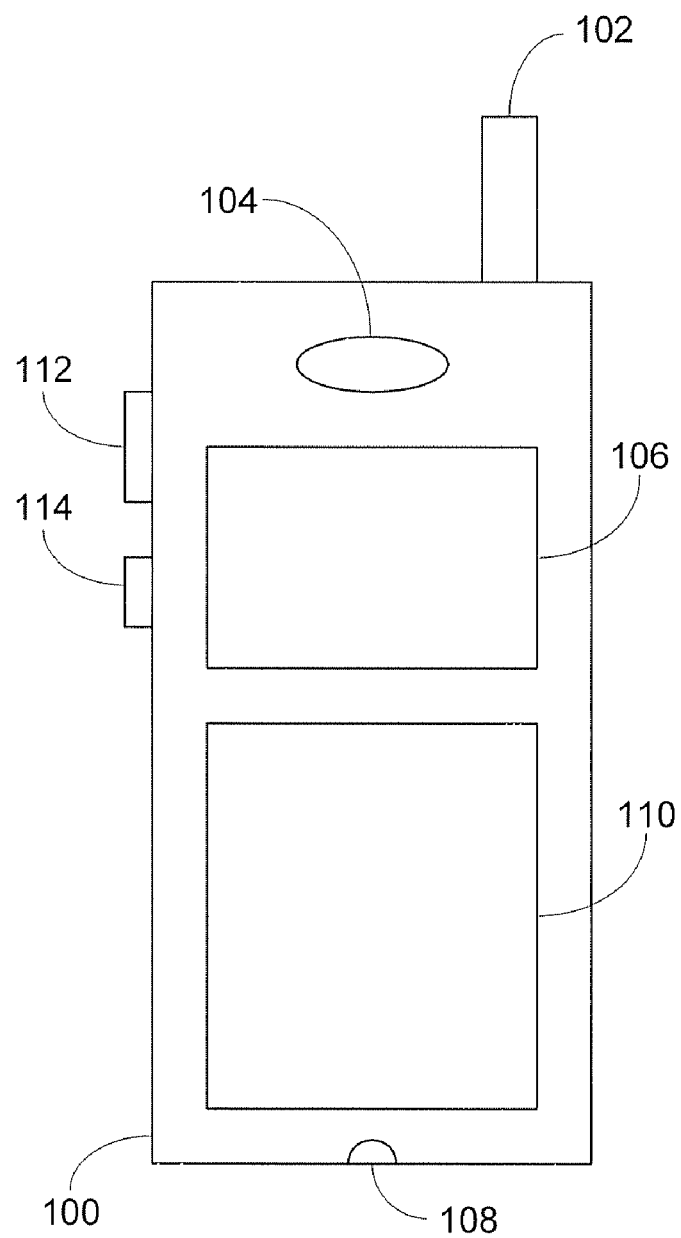
FIG. 3 is a simplified block diagram of a mobile station, in accordance with an exemplary embodiment.

As shown in FIG. 3, an exemplary mobile station 100 may include an antenna 102, a speaker 104, a display screen 106, a microphone 108, and various user controls. Mobile station 100 may send and receive wireless signals through antenna 102. Display screen 106 may display graphics and/or text to the user. Speaker 104 and microphone 108 may be used for audio communication. For example, mobile station 100 may play audio communications, such as from PTT communications and wireless telephone calls, through speaker 104. Mobile station 100 may also play audio signals such as beeps and ringtones through speaker 104. Microphone 108 receives audio that mobile station 100 may convey in PTT audio communications and wireless telephone calls. Instead of or in addition to speaker 104 and microphone 108, mobile station 100 may be communicatively coupled to an external speaker/microphone system, such as a "hands free" system.

The user controls on mobile station 100 may include one or more buttons, switches, thumbwheels, and/or other mechanisms that the user can actuate to control the operation of mobile station 100. For example, the user controls may include a plurality of buttons arranged in a keypad 110 on the front of mobile station 100. The buttons on keypad 110 may include, for example, buttons for entering alphanumeric text and function keys for performing functions such as turning the mobile station on and off, sending and ending wireless telephone calls, and navigating through and selecting menu items displayed on display screen 106.

User controls could also be located in other areas of mobile station 100. For example, a speaker volume control 112 and a PTT button 114 may be mounted on a side of mobile station 100. As described in more detail below, speaker volume control 112 may be used to control the volume of the audio played through speaker 104. Speaker volume control 112 might also be used to turn speaker 104 off and on. PTT button 114 may be used to send a PTT audio communication from mobile station 100. For example, a user may press PTT button 114 to initiate a PTT audio communication and then speak into microphone 108 while holding PTT button 114. The user may release PTT button 114 when finished speaking.

It is to be understood that the above-described arrangement of user controls is exemplary only. Other types and/or arrangements of user controls could be provided. As one example, display screen 106 might also function as a touch screen. In that case, the user might control mobile station 100 by interacting with the touch screen, e.g., using a stylus. As another example, mobile station 100 might be controlled externally via a wireless link (e.g., using Bluetooth). As still another example, mobile station 100 might be controlled by voice commands.

5. Exemplary Push-to-Talk Method

Figure 4:
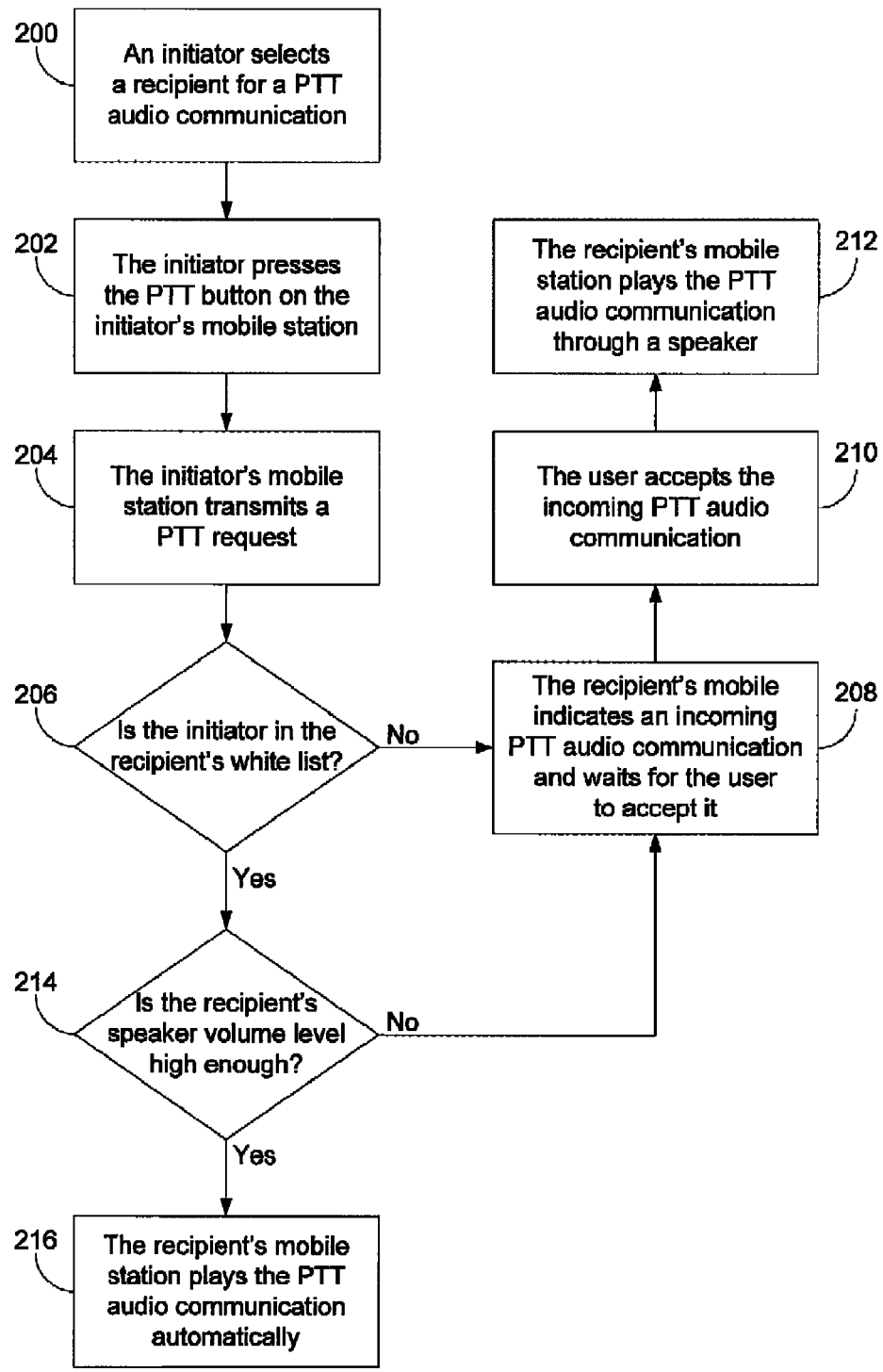
FIG. 4 is a flow chart illustrating a PTT communication method, in accordance with an exemplary embodiment.

FIG. 4 illustrates an exemplary push-to-talk (PTT) method, in which an initiator uses a mobile station to send a PTT audio communication to a recipient's mobile station. For purposes of illustration, the initiator's mobile station and the recipient's mobile station are described with reference to the exemplary mobile station 100 illustrated in FIG. 3. However, it is to be understood that the initiator's and/or the recipient's mobile station could be differently configured.

The process may begin when an initiator selects a recipient for a PTT audio communication, as indicated by block 200. The recipient may do this by interacting with a user interface of the recipient's mobile station. For example, with reference to mobile station 100 illustrated in FIG. 3, the initiator may first press one or more function keys in keypad 110 so that the initiator's contact list is displayed on display screen 106. The initiator may then use one or more function keys in keypad 110 to navigate through the contact list and to select one or more recipients.

The contact list may display the names and/or mobile directory numbers (MDNs) of potential recipients. The contact list may also display status information regarding potential recipients. The status information may indicate that a potential recipient is available to receive a PTT audio communication or that a potential recipient is unavailable to receive a PTT audio communication (e.g., because the potential recipient has activated a "Do Not Disturb" feature). The status information may also indicate whether the "forced audio" mode or the "polite" mode is available for a potential recipient. The status information could be displayed graphically on display screen 106, for example, using different icons to represent different status conditions. The initiator's mobile station may receive this status information from PTT server 38 (or from some other network element) in response to the initiator's navigation through the contact list.

Once the initiator has selected a recipient, the initiator presses the PTT button on the initiator's mobile station, as indicated by block 202. In response, the initiator's mobile station transmits a PTT request, as indicated by block 204. The PTT request is a message that requests sending a PTT audio communication to the recipient's mobile station. For example, the PTT request could be a SIP INVITE message or a QSP message. In some cases, the PTT request may specify a particular PTT mode for the PTT audio communication. For example, the initiator might select a PTT mode to use for the PTT audio communication, either before or after the initiator selects the recipient. Alternatively, the PTT client in the initiator's mobile station might select the PTT mode automatically. In other cases, the PTT request might not specify any particular PTT mode.

For purposes of illustration, it will be assumed that the PTT request in block 204 specifies a forced audio PTT mode. The subsequent steps in the method of FIG. 4 will then determine whether the PTT audio communication will actually be processed in accordance with the forced audio mode. It is to be understood, however, that if the PTT request in block 204 does not specify a particular PTT mode, then the subsequent steps in FIG. 4 will determine the PTT mode.

In particular, whether the forced audio PTT mode will be used may depend on whether the initiator is in the recipient's white list, as indicated by block 206. This determination could be made in the network (e.g., by PTT server 38), or it could be made by the recipient's mobile station. For example, PTT server 38 may receive the initiator's PTT request and then refer to the recipient's profile to determine whether the initiator is identified in the recipient's white list. Alternatively, the recipient's mobile station may receive the PTT request and check the white list in the profile stored on the recipient's mobile station.

If the initiator is not identified in the recipient's white list, then the PTT audio communication does not proceed as a forced audio communication. Instead, the recipient's mobile station generates an indication of an incoming PTT audio communication and waits for the user to accept it, as indicated by block 208. In particular, the recipient's mobile station may wait for a preset period of time for the user to accept the PTT audio communication.

The indication generated by the recipient's mobile station may include, for example, graphics or text displayed on display screen 106, a beep or other sound played through speaker 104, a vibration, and/or some other form of user-discernible indication. Preferably, the indication of an incoming PTT audio communication differs from the ringing tones or other alert signal that the mobile station generates in response to an incoming telephone call. In this way, the recipient can determine whether the recipient's mobile station is receiving a PTT audio communication or a telephone call.

In this example, the user accepts the incoming PTT audio communication, as indicated by block 210. The user may indicate acceptance, for example, by pressing a button on keypad 110 or in some other manner. In response to the user's acceptance, the recipient's mobile station plays the PTT audio communication, e.g., through speaker 104, as indicated by block 212. If, on the other hand, the user had not accepted the incoming PTT audio communication within the preset period of time, the PTT audio communication may fail and the initiator may be notified that the recipient did not accept the communication.

The process indicated by block 212, in which the recipient's mobile station plays the PTT audio communication through a speaker, may occur in different ways. In one approach, the user's acceptance (block 210) is conveyed to the initiator by having the initiator's mobile station generate a readiness signal to indicate that the initiator may begin speaking. The readiness signal could be, for example, a tone or other audio signal. Moreover, different tones may be played, depending on whether the forced audio or polite mode is being used. When the initiator begins speaking, the audio may be conveyed to the recipient's mobile station, where it is played out through a speaker (block 212).

In another approach, the initiator may begin speaking before the recipient accepts the communication. In that case, the audio may be buffered in the network (e.g., in PTT server 38) or in the recipient's mobile station. The user's acceptance (block 210) may then cause the buffered audio to be played out through the recipient's mobile station (block 212).

In the process described above for blocks 208-212 the initiator's forced-audio mode PTT communication was effectively converted to a polite mode PTT communication because the initiator was not in the recipient's white list and, therefore, lacked permission to communicate with the recipient using the forced-audio PTT mode. If, on the other hand, the initiator is identified in the recipient's white list, then the forced-audio PTT mode may be available, depending on whether the speaker volume level of the recipient's mobile station is high enough, as indicated by block 214.

If the speaker volume level is high enough, i.e., above a predetermined threshold, then the forced audio mode is available. In that case, the recipient's mobile station plays the PTT audio communication automatically (e.g., through speaker 104), as indicated by block 216. However, if the speaker volume level is below the predetermined threshold, then the polite mode is used instead. Thus, the recipient's mobile station plays the PTT audio communication only after acceptance by the user, as indicated by blocks 208-212.

6. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for push-to-talk (PTT) communication, said method comprising:
   receiving from an initiator a PTT request to send a PTT audio communication to a recipient, said recipient being associated with a recipient mobile station;
   determining a permission level for said PTT audio communication, wherein determining a permission level for said PTT audio communication comprises determining a speaker volume level on said recipient mobile station;
   if said permission level is at a first level, said recipient mobile station processing said PTT audio communication in accordance with a first PTT mode; and
   if said permission level is at a second level, said recipient mobile station processing said PTT audio communication in accordance with a second PTT mode.

2. The method of claim 1, wherein said recipient mobile station processing said PTT audio communication in accordance with a first PTT mode comprises:
   said recipient mobile station playing said PTT audio communication automatically.

3. The method of claim 1, wherein said recipient mobile station processing said PTT audio communication in accordance with a second PTT mode comprises:
   said recipient mobile station playing said PTT audio communication only after acceptance by a user of said recipient mobile station.

4. The method of claim 1, wherein determining a permission level for said PTT audio communication further comprises:
   referring to a profile associated with said recipient, wherein said profile defines a first list that identifies any parties that are allowed to communicate with said recipient mobile station using said first PTT mode.

5. The method of claim 4, wherein determining a permission level for said PTT audio communication further comprises:
   determining that said initiator is identified in said first list; and
   determining that said permission level is at said first level.

6. The method of claim 4, wherein determining a permission level for said PTT audio communication further comprises:
   determining that said initiator is not identified in said first list; and
   determining that said permission level is at said second level.

7. The method of claim 1, wherein determining a permission level for said PTT audio communication further comprises:
   determining that said speaker volume level is below a threshold; and
   determining that said permission level is at said second level.

8. The method of claim 1, further comprising:
   populating said first list with at least one party; and
   responsively increasing a slot cycle frequency of said recipient mobile station.

9. The method of claim 1, wherein said initiator is associated with an initiator mobile station, further comprising:

a user interacting with a user interface on said initiator mobile station to select said recipient.

10. The method of claim 1, wherein said PTT request requests said first PTT mode, further comprising:
determining that said permission level is at said second level; and
said recipient mobile station processing said PTT audio communication in accordance with said second PTT mode.

11. The method of claim 1, wherein determining a permission level for said PTT audio communication further comprises:
determining that said speaker volume level is above a threshold; and
determining that said permission level is at said first level.

12. A system comprising:
a mobile station, said mobile station having a plurality of modes for processing incoming push-to-talk (PTT) audio communications, said plurality of modes including a first mode, in which said mobile station plays PTT audio communications through a speaker automatically, and a second mode, in which said mobile station plays PTT audio communications through said speaker only after acceptance by a user of said mobile station,
wherein said mobile station is configured to select, from among said plurality of modes, a mode for processing an incoming PTT audio communication from a party based, at least in part, on a volume level of said speaker.

13. The system of claim 12, further comprising:
a profile, wherein said profile defines a first list that identifies any parties that are allowed to communicate with said mobile station using said first mode.

14. The system of claim 13, wherein said mobile station operates at a low slot cycle frequency when said first list is empty and operates at a high slot cycle frequency when said first list identifies at least one party.

15. The system of claim 13, further comprising:
a communication server for controlling PTT communications with said mobile station in accordance with said profile.

16. The system of claim 15, wherein said communication server is configured to convert a first-mode PTT communication for said mobile station from a party not identified in said first list to a second-mode PTT communication.

17. The system of claim 13, wherein said profile further defines a second list that identifies any parties that are forbidden to communicate with said mobile station using any of said first and second modes.

18. The system of claim 13, wherein said mobile station is configured to select said first mode for processing said incoming PTT audio communication when said party is identified in said first list and said volume level is above a threshold.

19. The system of claim 18, wherein said mobile station is configured to select said second mode for processing said incoming PTT audio communication when said party is identified in said first list and said volume level is below said threshold.

20. The system of claim 13, wherein said mobile station is configured to select said second mode for processing said incoming PTT audio communication when said party is not identified in said first list.

* * * * *